Figure 1:
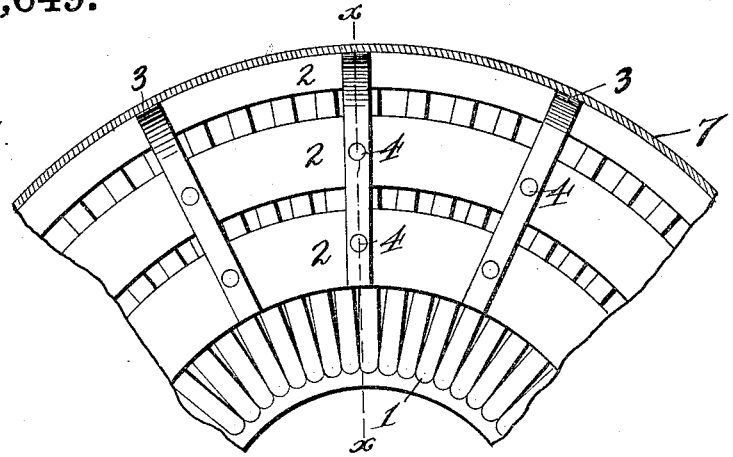

W. SCACE.
RESILIENT TIRE.
APPLICATION FILED AUG. 16, 1913.

1,110,649.

Patented Sept. 15, 1914.

Witnesses:
F. J. Phillips.
D. E. Miller

Inventor
William Scace
By Geo. P. Kimmel,
Attorney

UNITED STATES PATENT OFFICE.

WILLIAM SCACE, OF PITTSFIELD, MASSACHUSETTS.

RESILIENT TIRE.

1,110,649.  Specification of Letters Patent.  Patented Sept. 15, 1914.

Application filed August 16, 1913. Serial No. 785,053.

*To all whom it may concern:*

Be it known that I, WILLIAM SCACE, citizen of the United States, residing at Pittsfield, in the county of Berkshire and State of Massachusetts, have invented certain new and useful Improvements in Resilient Tires, of which the following is a specification.

This invention relates to improvements in resilient tires and wheels and more specifically to metallic spring tires.

The object of my invention is to provide a resilient tire for automobiles and trucks which, in addition to resiliency, will embody the feature of durability, in that a puncture will have no effect on it, and as it is constructed of steel it will withstand ordinary wear and tear.

It also obviates the necessity of inflation though retaining the same contour as an inflated pneumatic tire.

With the above and other objects in view, my invention consists in the combination, arrangement, and details of construction disclosed in the drawings and specifications, and then, more particularly pointed out in the appended claim.

Figure 2:
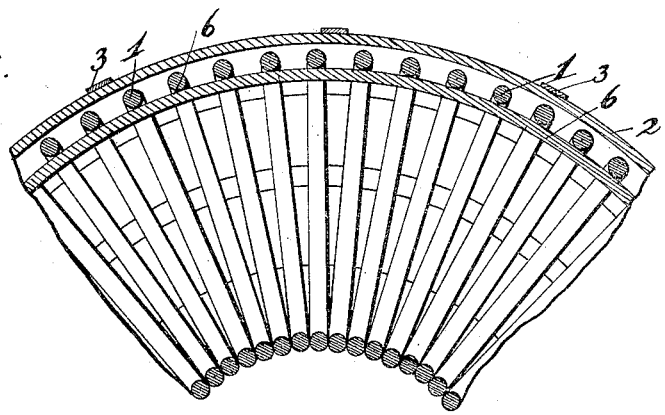
Figure 3:
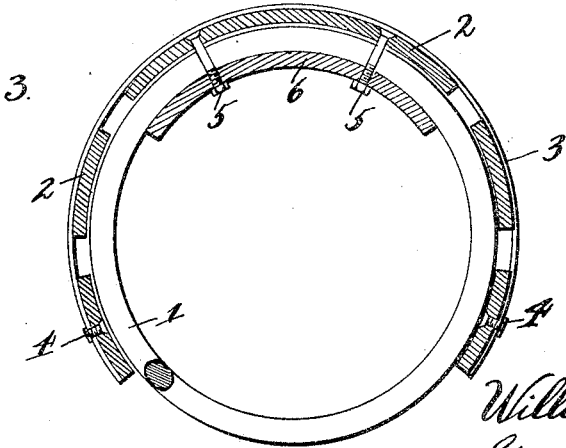

Referring to the drawings, wherein similar reference characters designate similar parts throughout the respective views, Figure 1 is a fragmental side elevation of my resilient tire with a section of the outer covering removed to disclose the internal arrangement. Fig. 2 is a central circumferential section while Fig. 3 is a cross-sectional view taken on the line x—x of Fig. 1, looking in the direction of the arrow.

Referring to the drawings, which are merely illustrative of my invention, 1 designates a closed cylindrical spring whose convolutions proceed continuously in the direction of the circumference of the tire and which forms the core thereof. This core is armored by steel rims 2, which are spaced apart and substantially cover the exposed portion of a tire above a wheel rim. Each of these rims 2 is held in spaced apart relation by cross-bands 3 bolted to each of said rims at 4, the entire set of five rims being secured upon the core 1, by bolting them at 5 to a steel band 6 which fits within the said core. The tire as thus composed may be covered by an outer tread 7 of any suitable material to insure smooth surface contact.

From the above construction the various parts of my invention will have been made clear. The series of rims 2 are yieldable so as to give freely when the springs are put under tension incidental to the operation of the tire. These rims 2 are secured by the rivets 4 directly to the flexible bands 3 which latter bands extend along the sides of the springs as well as along the tread thereof. Since only the rims 2 which are disposed along the tread of the springs are secured by the fasteners 5 to the yieldable inner concavo-convex band 6 there will be greater freedom for the remaining rims 2 disposed along the sides of the springs to spread yieldingly under the compressing action of the springs. This is one of the important features of my invention by virtue of which the springs are placed between the band 6 and the outer rims 2, the bands 3 being secured to said rims 2 to the band 6 by means of the fasteners 5 alone.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention and falling within the purview of the appended claim.

I claim as my invention:

A spring tire comprising a circumferentially extending series of coil springs, a plurality of spaced apart yieldable rims arranged around the tread and sides of said springs, said springs forming the core of said tire, a concavo-convex inner yieldable band engaging the inner circumference of said springs, a plurality of flexible strips secured to all of the said rims, and means whereby the rims disposed along the tread of said springs are secured to said concavo-convex yieldable band.

In testimony whereof I affix my signature in presence of two witnesses.

WILLIAM SCACE.

Witnesses:
R. P. PARKER,
MARTHA B. EVANS.